(12) United States Patent
Sendelweck et al.

(10) Patent No.: US 6,900,848 B2
(45) Date of Patent: May 31, 2005

(54) CROSSTALK REDUCTION IN A VIDEO SIGNAL SELECTOR

(75) Inventors: Gene Karl Sendelweck, Indianapolis, IN (US); Daniel Lee Reneau, Fishers, IN (US)

(73) Assignee: Thomson Licensing S.A., Billancourt (FR)

( * ) Notice: Subject to any disclaimer, the term of this patent is extended or adjusted under 35 U.S.C. 154(b) by 444 days.

(21) Appl. No.: 10/019,383

(22) PCT Filed: Apr. 19, 2001

(86) PCT No.: PCT/US01/12774

§ 371 (c)(1),
(2), (4) Date: Dec. 27, 2001

(87) PCT Pub. No.: WO01/84845

PCT Pub. Date: Nov. 8, 2001

(65) Prior Publication Data

US 2003/0071802 A1 Apr. 17, 2003

Related U.S. Application Data

(60) Provisional application No. 60/201,052, filed on May 1, 2000.

(51) Int. Cl.[7] .......................... H04N 5/21; H04N 5/213; H04N 5/217; H04N 3/27; H04N 5/46
(52) U.S. Cl. .................. 348/607; 348/609; 348/663; 345/58
(58) Field of Search ................. 348/607, 609, 348/610, 663–668, 554–555, 705–706, 712; 345/58; 386/22, 115; H04N 5/21, 5/213, 5/217, 3/27, 5/46

(56) References Cited

U.S. PATENT DOCUMENTS

| | | | | |
|---|---|---|---|---|
| 4,525,738 A | * | 6/1985 | Imazeki et al. | 348/706 |
| 4,644,387 A | * | 2/1987 | Bell et al. | 348/554 |
| 5,034,818 A | * | 7/1991 | Baik-Hee | 348/706 |
| 5,253,044 A | * | 10/1993 | Lamy | 348/706 |
| 5,374,962 A | * | 12/1994 | Klink | 348/557 |
| 5,422,668 A | * | 6/1995 | Chanteau et al. | 725/151 |
| 6,414,723 B1 | * | 7/2002 | Hwang et al. | 348/588 |
| 6,486,924 B1 | * | 11/2002 | Paraskevopoulos et al. | 348/705 |
| 6,577,348 B1 | * | 6/2003 | Park | 348/554 |

FOREIGN PATENT DOCUMENTS

| | | | | |
|---|---|---|---|---|
| GB | 2307122 A | 5/1997 | ......... | H03K/17/16 |
| JP | 62166614 | 7/1987 | ......... | H03K/17/00 |
| JP | 62269577 | 11/1987 | ............ | H04N/5/44 |
| JP | 63127615 | 5/1988 | ......... | H03K/17/00 |
| JP | 05068214 | 3/1993 | ............ | H04N/5/44 |

* cited by examiner

Primary Examiner—Brian P. Yenke
(74) Attorney, Agent, or Firm—Joseph S. Tripoli; Joseph J. Laks; William A. Lagoni

(57) ABSTRACT

A video signal input selector is subject to cross coupling between selectable video signals. The input selector comprises a video amplifier coupled to amplify a video signal selected from said selectable video signals. A controllable switch has first and second elements, the first element receives the selected video and is coupled to signal ground. The second element receives the selected video and is coupled to the amplifier. During a first condition the first element is controlled to be open circuit and the second element is controlled to be short circuit coupling the selected video signal to the video amplifier. In a second condition the first element is controlled to short circuit the selected video signal to the signal ground and the second element is controlled to be open circuit substantially inhibiting the selected video signal from coupling to the video amplifier.

9 Claims, 1 Drawing Sheet

CROSSTALK REDUCTION IN A VIDEO SIGNAL SELECTOR

This application claims the benefit under 35 U.S.C. §365 of International Application PCT/US01/12774, filed Apr. 19, 2001, which claims the benefit of U.S. Provisional Patent Application No. 60/201,052, filed May 1, 2000.

This invention relates to the field of signal source selection and in particular to the reduction of crosstalk between signals coupled for source selection.

BACKGROUND OF THE INVENTION

In typical analog video signal source selectors, for example switching matrices or vision switchers, the physical circuit layout is given as much attention as the circuit design of the switching or cross point elements. For example, on printed conductor boards, a ground plane may be interspersed between signal carrying conductors. Similarly grounded conductive layers may be used separate signals likely to contain frequencies having a greater susceptibility to cross coupling to adjacent signal conductors. Often coaxial cable conductors are employed or printed conductors arranged to emulate transmission line characteristics in order to inhibit unwanted coupling of signal energy into adjacent circuits. In a video display device such preventative crosstalk prevention methods may be precluded by virtue of physical space, display layout and product cost. Thus, a video display device which can be capable of receiving multiple baseband analog signal inputs in both standard and high definition TV signal formats from such sources as digital or analog recorders, a satellite TV receiver, DVD player, or computer, may be subject to undesirable and unwanted picture impairment resulting from signal cross coupling.

Component signal formats often comprise a luminance signal with red and blue color difference signals, frequently expressed as Y Pr Pb, and for a digitally derived signal of standard definition, can contain a luminance signal spectra extending to about 5 MHz. Similarly a luminance signal derived from a high definition source can result in a luminance signal spectra extending to 20 MHz and beyond. Typically the color difference signals are constrained to have significantly less bandwidth, typically half or a quarter that of the luminance component and hence these signals pose a less severe crosstalk threat.

Furthermore multiple input signals can occur in both standard and high definition TV signal formats which are asynchronous one with the other, or expressed another way, the plurality of input signals have differing timebase frequencies. Hence, crosstalk susceptible signals will be more obviously displayed as a consequence of the relative motion between the synchronizing signals of the selected signal and the timebase of the unwanted cross coupled component.

In the exemplary switching matrices and vision switchers mentioned previously, input signals are often synchronized or standards-converted to achieve a common timebase frequency. In addition, such synchronized or standards-converted signals are usually coupled within the matrix or switcher to enable simultaneous signal selection at multiple destinations. Thus it can be appreciated that the various physical coupling methods described earlier, directed to the prevention of unwanted signal coupling are an essential prerequisite. Hence any residual cross coupling can only exist as a consequence of crosstalk across the signal source selector or switch to produce an unwanted signal at the signal processing destination. Such cross coupling can often occur at the signal source selector by virtue of parasitic capacitance present between open circuit or non-selected switching contacts or elements. Thus signal source selectors frequently have the form of a series shunt combination of switching elements. In this arrangement a series switch element couples or inhibits coupling of the wanted signal to the destination. The shunt switch element is turned on when the series switch element is open thus effectively grounding the output of the series switch and removing any unwanted signals coupled via the parasitic capacitance of the open circuit series switch. A series shunt switching combination is controlled in an inverse manner such that when one switching element is on the other is off, in this way any unwanted crosstalk signals are largely prevented for contaminating the wanted signal source selection.

However, as mentioned previously, the preventative crosstalk techniques employed in video matrices although desirable are generally precluded from use in a video display device by cost and space considerations. As a consequence a video display device capable of selecting between multiple viewing sources, some asynchronous, in both standard and high definition formats can result in severe signal crosstalk with wanted picture degradation. Furthermore, although the series shunt switching arrangement described previously provides a remedy for signal coupling or leakage across the series switch element, any cross coupling occurring prior to the series shunt switching elements is largely unremedied, with the consequence that the selected picture remains impaired.

SUMMARY OF THE INVENTION

Cross coupling in a video selector between unwanted and wanted signals is obviated by an inventive switching arrangement. A video amplifier is coupled to amplify a selected video signal. A controllable switch has first and second elements, the first element receives the selected video signal and is coupled to a signal ground. The second element receives the selected video signal and couples to the video amplifier. In a first condition the first element is controlled to be open circuit and the second element is controlled to be short circuit controllably coupling the selected video signal to the video amplifier. In a second condition the first element is controlled to be short circuit coupling the selected video signal to the signal ground and the second element is controlled to be open circuit substantially inhibiting coupling to the video amplifier.

DETAILED DESCRIPTION

Figure 1:
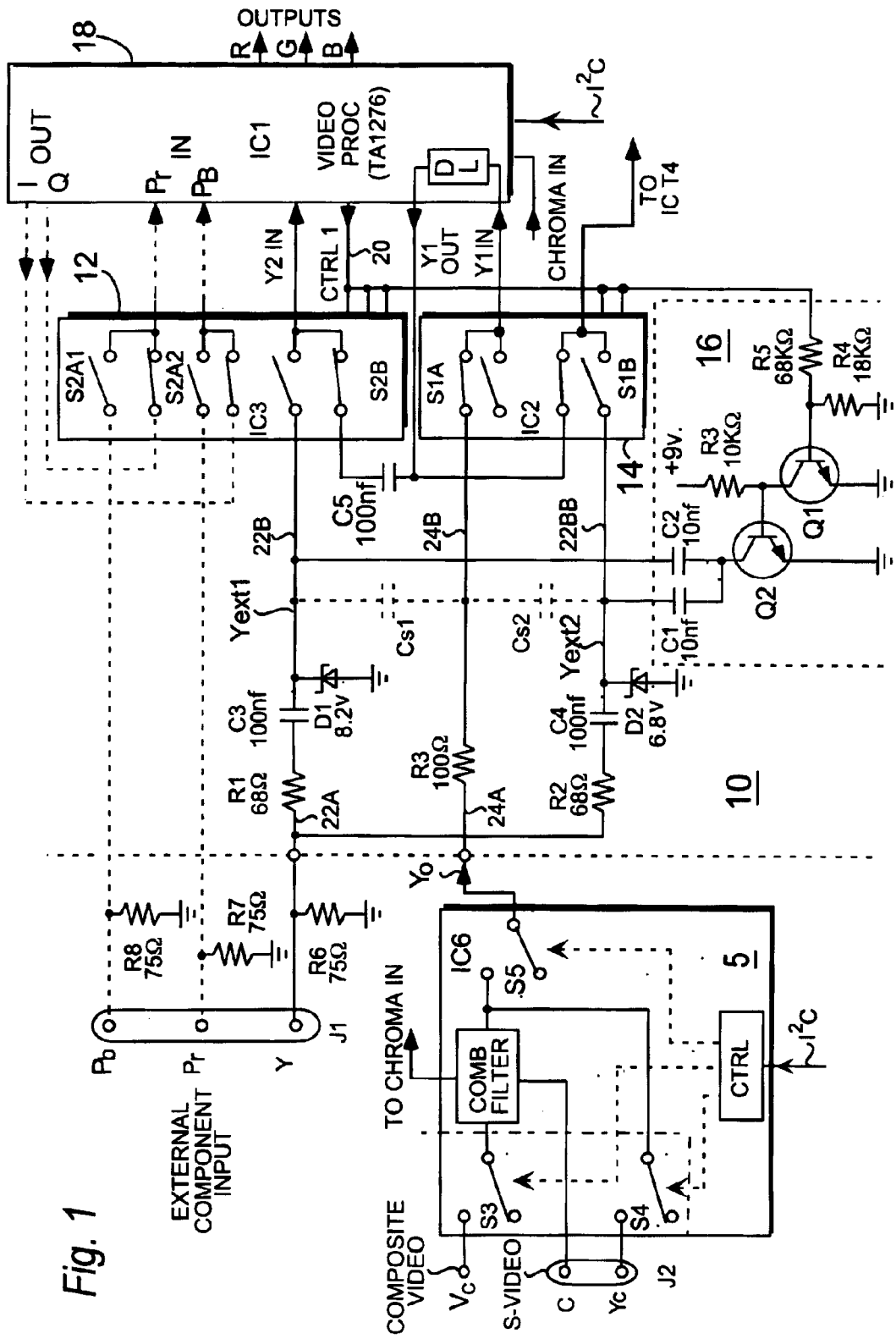
FIG. 1 is a simplified block diagram of a video signal selector for a display apparatus including inventive arrangements.

A video input selector for a multimedia display device is depicted in simplified form in FIG. 1. FIG. 1 includes selector 5, which forms part of integrated circuit 6, allows user selection by means of I²C control bus, between a composite encoded video signal Vc, for example, a NTSC or PAL encoded signal, and a luminance signal component Yc input from a signal source which provides separate luminance and chrominance signal components, for example S-Video, coupled via connector J2. Switch 4 couples the composite encoded video signal, (NTSC or PAL), to a comb filter within IC 6 that removes color subcarrier signals and provides separation of luminance and chrominance (chroma) components from the composite signal Vc. Switch 3 selects the luminance video component Yc input from an S-video signal input at connector J2. Since the luminance component Yc represents a separated or derived luminance signal it does not require comb filtering to remove any color subcarrier signal, thus it is coupled within IC 6 to a point following comb filter processing. Integrated circuit 6, for example an F2PIP/Comb filter, generates both a chrominance signal (chroma) and a luminance signal (Yo) responsive to selection controlled by the $I^2C$ control bus. Signal Yo is coupled via a wire conductor to provide an input signal that is coupled via printed conductor track 24A to a series connected resistor R3 and via printed conductor track 24B to selector switch S1A of IC 2, for example CMOS type 74HC4053. The chrominance signal, chroma, from block IC 6 is coupled directly to video processor integrated circuit IC 1, for example Toshiba type TA1276, for demodulation to produce color difference signal components. The demodulated color difference signals for example I/Q or R-Y/B-Y are output from video processor IC 1 and coupled to selector switches S2A1 and S2A2 of IC 3 which facilitates selection between demodulated color difference signals and component input color difference signals, Pr/Pb from an external signal source.

An external component signal, for example denoted as Y Pr Pb and originating from, for example, a VCR, DVD player, satellite or terrestrial digital television DTV receiver can be applied to input connector J1. As described, depending on the signal source the external luminance signal Yext can contain signal frequency components in the order of 5 MHz for signals from a DVD player, and in excess of 20 MHz for DTV signal derived from a high definition television signal source. Signals Y, Pr, Pb present at connector J1 are terminated by resistors R6, R7, and R8 respectively and coupled directly to circuit block 10. External color difference component signals Pr and Pb are coupled, via protection circuitry not shown but similar to that shown for luminance signal Yext, to switch S2A of integrated circuit IC 3, for example CMOS type 74HC4053, for selection as described previously. The external luminance component signal Yext is coupled via printed conductor track 22A where it is divided and applied to a pair protection networks formed by a series connected resistor R1(R2) and capacitor C3 (C4) and terminated by a Zener diode D1 (D2) which is connected to ground. Zener diodes D1 and D2 provide asymmetrical voltage amplitude protection and have different breakdown voltages in correspondence with expected operating signal amplitudes.

Luminance signal Yext is AC coupled by capacitor C3 and supplied as signal Yext1 to selector switch S2B of integrated circuit IC 3 for coupling to video processor IC 1 as signal Y2in. Similarly signal Yext is AC coupled by capacitor C4 and supplied as signal Yext2 to switch S1B of integrated circuit IC 2 for coupling as a synchronizing signal to integrated circuit T4 (not shown).

Stray or parasitic capacitance can exist between printed conductor tracks 22B and 22BB respectively, and track 24B. These stray capacitances are depicted as capacitors Cs1 and Cs2 shown with dashed lines. It can be appreciated that when a luminance signal Yext is present on connector J1, high frequency energy present in signals Yext1 and Yext2 will be coupled via stray capacitors Cs1 and Cs2 to conductor 24B and consequently luminance signal Yo. Similarly luminance signal Yo will be coupled onto conductor tracks 22B and 22BB. However, this reciprocal cross coupling is avoided because signal Yo is inhibited when viewing external component signals, as will be explained.

When an external component signal is selected for viewing, by means of the $I^2C$ bus, switches S1 and S2A/B of circuit block 10 change from the position depicted in FIG. 1 to permit coupling of luminance signal Yext to video processor IC 1 and to provide a delayed signal for synchronizing integrated circuit T4 (not shown). Furthermore selecting the external component signal also results in switches 3, 4, and 5 within the FPIP/Comb filter IC 6 assuming a condition which removes both chrominance signal (chroma), and luminance signal (Yo) from the output of block 6. Thus, no internally processed luminance or chrominance signals are coupled to selector 10, and printed conductors tracks 24A and 24B. Thus unwanted cross coupling between internal luminance signal Yo and external luminance signals Yext1/Yext2 is prevented.

When viewing an internally derived signal, unwanted cross coupling between an external luminance signal Yext1/Yext2 and internal luminance signal Yo is advantageously prevented by an inventive arrangement shown in block 16 which will now be described.

Selection between an external component signal and the various internally derived signals is controlled by addressing the various switching elements via the $I^2C$ control bus. Video processor IC 1 receives the $I^2C$ control bus and generates switch control signal 20 (CTRL 1), which is coupled to switches S1 and S2A/B which provide a series switching function to select between internal and external luminance and color difference signals. In addition control signal 20 is coupled to an inventive shunt switch shown in block 16 and applied to the base terminal of an NPN transistor Q1 via resistor R5. The base terminal of transistor Q1 is also coupled to ground via resistor R4 thus providing a potential divider for control signal 1. The collector of transistor Q1 is connected to the base terminal of an NPN transistor Q2 and to a power supply, for example+9v, via resistor R3. The emitter terminals of transistors Q1 and Q2 are connected to ground. The collector of transistor Q2 is connected to a pair of capacitors C1 and C2. Capacitor C2 is connected to the junction of capacitor C3, zener diode D1 and an input of switch S2B via conductor 22B. Similarly capacitor C1 is connected to the junction of capacitor C4, Zener diode D2 and an input of switch S1B at conductor 22BB.

Operation of inventive shunt switch 16 will now be explained. When an external component signal is selected control signal 20, assumes a positive voltage value of approximately 5 volts or greater, and conversely when the internally derived signals are selected control signal 20 assumes a low or substantially zero voltage value. Thus with external components selected, the positive voltage of control signal 20 causes transistor Q1 to turn on and assume a saturated state. With transistor Q1 saturated, transistor Q2 receives no base current and is held off with the collector terminal assuming a high impedance. Thus, capacitors C1 and C2 are effectively connected in series between nominally identical, AC coupled signals Yext1 and Yext2 present on conductors 22B and 22BB respectively. As described previously, unwanted cross coupling of internal signal Yo via stray capacitors Cs1 and Cs2 into external luminance signals Yext1/Yext2 is prevented within block 5 of IC6.

When internally derived components are selected for display, switch control 1 has a nominally zero voltage value which turns transistor Q1 off causing the collector terminal to become a high impedance. With transistor Q1 off resistor R3 supplies current from the positive supply to the base of transistor Q2 which is sufficient to cause saturation. With transistor Q2 saturated, a very low impedance is formed between the transistor collector and emitter terminals, which effectively connects the junction of capacitors C1 and C2 to ground at the emitter of transistor Q2. Thus capacitors C1 and C2 are controlled or switched to form AC signal attenuators that reduce the amplitude of external luminance signals Yext1 and Yext2 present on conductors 22B and 22BB. Capacitor C2 forms a shunt path for signal Yext1 with attenuation occurring across resistor R1 and capacitor C3 which attenuates the amplitude of signal Yext1 by about 30 dB at 5 MHz and about 41 dB at 20 MHz. Similarly for capacitor C1 which forms a shunt path for signal Yext2 with attenuation occurring across resistor R2 and capacitor C4 yielding a similar attenuation of signal Yext2. The AC signal attenuation that result from grounding capacitors C1 and C2 at the collector of transistor Q2 may also be considered to form selectable or switched lowpass filters having a corner frequency of about 165 KHz. Furthermore, if the impedance to ground at the junction of capacitor C4, Zener diode D2 and an input of switch S1 is defined by a high value resistor, for example 10 kilo ohm, connected in parallel or across switched capacitor C1, the selectable lowpass filter can be considered a selectable or switchable bandpass filter. With the exemplary 10 kilo ohm resistor in parallel with capacitor C1, a low frequency −3 dB point of about 150 Hz and a high frequency −3 dB point of about 160 KHz result which can advantageously provide filtering to remove power line and high frequency noise components present on conductor 22BB.

When internally derived components are selected for viewing any external luminance component signal input to the display will advantageously be attenuated and severely lowpass filtered at the input to selector switches 1 and 2. However this frequency dependent attenuation is controllably removed when an external component signal is selected for viewing. Thus high amplitude, high frequency signals present in an external luminance signal are advantageously attenuated to a level within the module at which cross coupling between conductors, and/or across open circuit switching elements, is substantially eliminated and rendered invisible.

What is claimed is:

1. A video display apparatus with video signal selection comprising:
   a source of a video signal coupled to a first and a second conductive path;
   a video amplifier for amplifying said video signal from said first conductive path;
   a sync separator for separating sync pulses from said video signal from said second conductive path;
   first and second controllable switches coupled to said first and a second conductive paths and coupling said video signal to said video amplifier and said sync separator respectively; and,
   at least one further controllable switch for grounding said first and second conductive paths when said first and second controllable switches uncouple said video signal from said video amplifier and said sync separator.

2. The video display apparatus of claim 1, when said first and second controllable switches uncouple said video signal from said video amplifier and said sync separator said at least one further controllable switch enables first and second lowpass filters coupled to said first and second conductive paths.

3. The video display apparatus of claim 1, when said first controllable switch couples said video signal to said video amplifier said at least one further controllable switch disables a first lowpass filter coupled to said first conductive path.

4. A video display apparatus of claim 1, wherein said source can supply a high definition video signal as said selectable video signal.

5. A video display apparatus of claim 1, wherein said first and second conductive paths juxtapose a further conductive video path.

6. A video signal input selector subject to cross coupling interference between selectable video signals, comprising:
   a source of a selectable video signal;
   a first conductive video path coupled to said source and having a first controllable switch;
   a second conductive video path coupled to said source and having a second controllable switch;
   a video amplifier coupled to said first controllable switch;
   a sync separator coupled to said second controllable switch; and,
   at least one further controllable switch for coupling said first and second conductive paths to ground when said first and second switches uncouple said source from said video amplifier and from said sync separator to inhibit transmission of said cross coupling interference.

7. The video signal input selector of claim 6, wherein said source can supply a high definition video signal as said selectable video signal.

8. The video signal input selector of claim 6, wherein said least one further controllable switch includes a two switched capacitor lowpass filters, coupled in parallel one with the other when said first and second switches uncouple said source, and coupled in series when said first and second switches couple said source to said video amplifier and said sync separator.

9. The video signal input selector of claim 6, wherein said least one further controllable switch includes at least one lowpass filter controllably activated and coupled to at least one of said first and second conductive video paths when at least one of said first and second switches uncouple said source, and said at least one lowpass filter is controllably deactivated when said at least one of said first and second switches couples said source.

* * * * *